United States Patent [19]
Misencik et al.

[11] Patent Number: 5,032,946
[45] Date of Patent: Jul. 16, 1991

[54] ELECTRICAL SURGE SUPPRESSOR AND DUAL INDICATOR APPARATUS

[75] Inventors: John J. Misencik, Shelton; Roy O. Wiley, Huntington, both of Conn.

[73] Assignee: Westinghouse Electric Corp., Pittsburgh, Pa.

[21] Appl. No.: 417,619

[22] Filed: Oct. 6, 1989

Related U.S. Application Data

[63] Continuation of Ser. No. 345,929, May 1, 1989, Pat. No. 4,912,590.

[51] Int. Cl.$^5$ .............................................. H02H 3/20
[52] U.S. Cl. ................................. 361/56; 361/91; 361/118; 361/127
[58] Field of Search ................... 361/56, 91, 111, 117, 361/118, 126, 127; 338/20, 21; 340/660, 662

[56]        References Cited
        U.S. PATENT DOCUMENTS

| | | | |
|---|---|---|---|
| 4,023,071 | 5/1977 | Fussell | 361/91 X |
| 4,212,045 | 7/1980 | Martzloff | 361/56 X |
| 4,439,807 | 3/1924 | Reitz | 361/127 |
| 4,688,135 | 8/1987 | Leopold | 361/118 |
| 4,979,071 | 12/1990 | Ito et al. | 361/56 |

Primary Examiner—Derek S. Jennings
Attorney, Agent, or Firm—G. H. Telfer

[57]        ABSTRACT

Surge suppression is provided by varistors connected between, respectively, hot and neutral conductors and hot and ground conductors, each through a common fuse that avoids hazardous overvoltages on the varistors. A first indicator circuit portion provides an indication that the power is on and surge protection is present and includes a first indicator device such as a green light-emitting diode that is energized when the fuse is intact, and a second indicator circuit portion is provided for indicating power is on and surge protection is lacking that includes a second indicator device such as a red light-emitting diode that is energized by the line conductors when the fuse has been interrupted. The surge suppressor and dual indicator apparatus can be contained within a wiring device such as a receptacle. A single varistor unit containing two varistor disks with three leads, including a center tap, allows three effective surge suppressor circuit branches in a compact configuration.

12 Claims, 3 Drawing Sheets

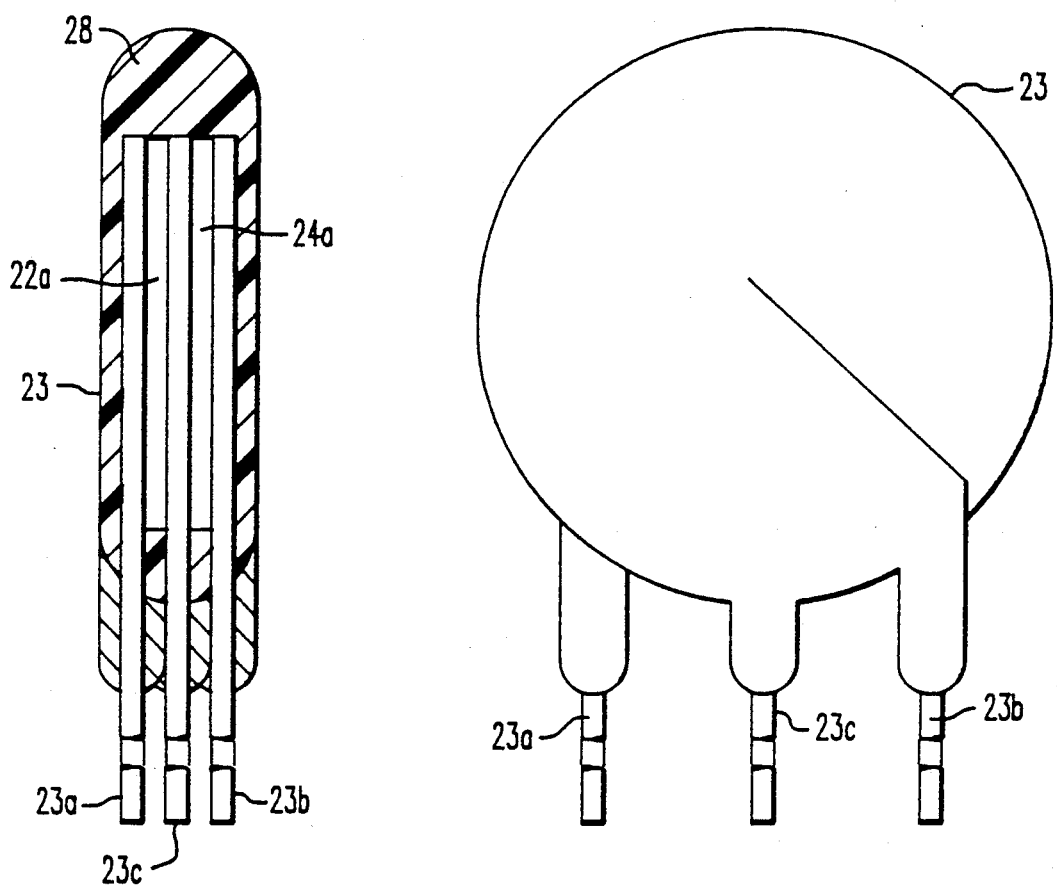

ELECTRICAL SURGE SUPPRESSOR AND DUAL INDICATOR APPARATUS

This is a continuation of U.S. patent application Ser. No. 07/345,929, filed May 1, 1989, now U.S. Pat. No. 4,912,590 issued Mar. 27, 1990.

BACKGROUND AND SUMMARY OF THE INVENTION

This invention relates to apparatus for the protection of loads connected with an electrical distribution system and for indication of the status and capability of the surge suppressor system. The invention relates particularly to such apparatus suitable for incorporation within household and commercial wiring devices.

It is beneficial to have a surge suppressor to protect loads against some voltage transients that do not trip the circuit breaker of a distribution circuit. This is particularly so in the case of relatively delicate electronic equipment such as video recorders, personal computers, and other valuable household and commercial appliances. It is also desirable to have an indication that the surge suppressor is in good working order.

It is recognized that considerable prior art relates to the protection of equipment against overvoltages with an indication of the occurrence of an overvoltage. Many protection systems are fairly complex, expensive and bulky. The present invention is primarily directed to a system that is simple, inexpensive and compact and is used, normally, for local load protection and is in addition to conventional distribution circuit protection devices such as circuit breakers.

In accordance with a prior art system for applications addressed by the present invention, a surge suppressor unit is provided in a receptacle into which the line cord for the load is plugged. It includes a suppressor circuit branch, for connection between the hot and neutral conductors of the distribution system, that includes a fuse and a metal oxide varistor in series. Such a surge suppressor circuit branch is connected between the hot and neutral conductors of a distribution system; other conductor pairs of a three wire system may be protected as well. The fuse is selected to have an interruption, for fire safety, if a failure of the varistor occurs, such as shorting due to an overvoltage. In such an arrangement it is known to utilize an indicator device, such as a green light-emitting diode, that is powered only if the fuse is intact. This light will light and therefore indicate the power is on and the fuse is present. If the indicator light is not on, this indicates the power is not on or the fuse has blown. It would be desirable to know which of these two events is the case.

Systems are known in which the one light used which is energized when everything is correct is arranged to blink if surge protection is lost. This requires an extra timing circuit portion and its attendant cost and complexity.

In accordance with another version of such equipment, there is provision to provide a buzzer alarm when protection is lost and the power is still on. This, too, incurs additional cost and complexity.

It is desirable to provide an alternative system that gives positive indication of whether the fuse is or is not operable by two distinct indicator devices in a relatively simple and inexpensive arrangement.

Therefore, in accordance with one aspect of the present invention, there is provided an electrical surge suppressor and indicator system that includes, at least, a first surge suppressor circuit branch for connection between two line conductors and including a fuse and a first varistor in series. A first indicator circuit portion indicates power is on and surge protection is present and includes a first indicator device energized by the line conductors if the fuse is intact. A second indicator circuit portion indicates power is on and surge protection is lacking and includes a second indicator device energized by the line conductors if the fuse has been interrupted.

In certain embodiments of the invention the first indicator device is a green light-emitting diode, and the second indicator device is a red light-emitting diode. Each light-emitting diode is in series with current-limiting resistance. In the case of the green light-emitting diode, which is energized when the fuse is intact, it is in series with a resistor and the red light-emitting diode is in series with that same resistance, plus an additional resistance. The first and second indicator circuit portions may both include the first resistor. The second indication circuit would then include a separate, second resistor that is not in the first indicator circuit portion.

When light emitting diodes (LEDs) are used as the indicator devices, they can be used in different ways to yield different characteristics in the information indicated. In one form of connection, the LEDs are like-poled; each is in inverse parallel relationship with another, standard, diode having a lower forward voltage drop. When the fuse is intact and the green LED is energized, there is some current drawn through the second circuit portion containing the red LED. With appropriate resistance present (so both the red and green are of approximate equal brightness when fully on), that current is sufficient to energize the red LED just slightly producing a perceptible but dim red glow while the green LED is fully energized and considerably brighter. This allows one to readily confirm the operability of both LEDs when power is on.

If one does not wish any perceptible output from the red LED when the green is energized, it is merely necessary to change the polarity of one of the LEDs, such as the green LED, and its respective secondary diode.

It is desirable in the systems of interest where there is surge protection between the hot and ground conductors to also have surge protection between the hot and neutral conductors as well as between the neutral and ground conductors. To do this, prior devices have had three separate varistor devices in appropriate circuit branches between the indicated conductors. They include a single fuse with respective varistors in branches between the hot and neutral conductors and between the hot and ground conductors. A third varistor, not in series with a fuse, is located between the neutral and ground conductors; if it fails its failure is not indicated externally.

A substantial degree of protection between the ground conductor and the neutral conductor is provided by the series connection of the first two varistor devices. In accordance with a further aspect of the invention, two similar varistor metal oxide disks are packaged as a unit within a single insulating casing and are provided with three terminals—one on each side of the outside surfaces, and a third centertap between the two disks. Therefore, with minimal bulk this provides effectively three varistors for protection between each pair of conductors. Any varistor failure, in contrast to the prior art, is indicated externally, such as by the dual indicator system described above. Such a compact, center-tapped, arrangement of two varistor disks is also believed novel and useful in other applications.

The compactness and economy of apparatus in accordance with the present invention allows its convenient use within ordinary wiring devices, such as receptacles for plugging in various kinds of appliances which are thus protected.

BRIEF DESCRIPTION OF THE DRAWING

FIGS. 4A and 4B are views of alternative varistor units in accordance with embodiments of the present invention; and FIG. 5 is a sectional view of a FIG. 4A type unit.

PREFERRED EMBODIMENTS

Figure 1:
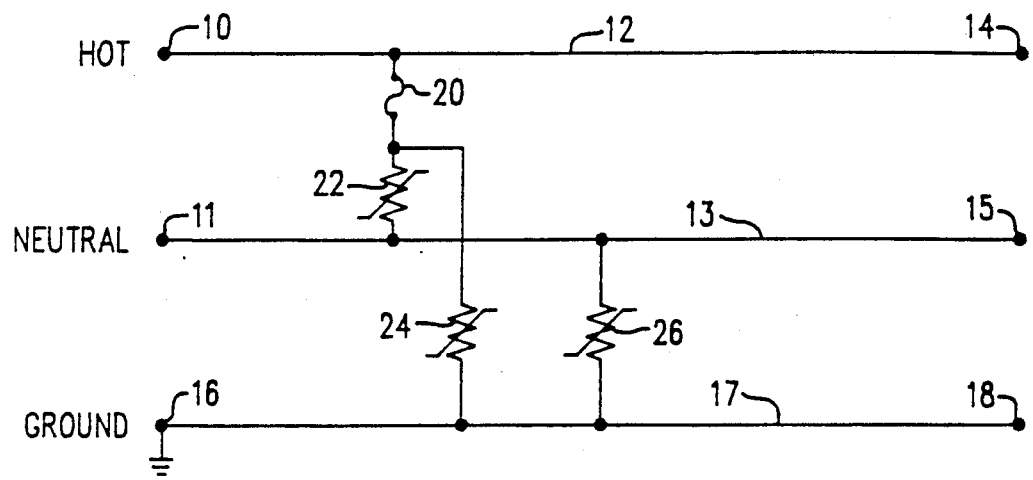
FIG. 1 is a circuit schematic of a known surge suppressor arrangement.

FIG. 1 is a circuit schematic illustrating a generalized surge suppressor showing surge protection provided by the prior art (FIG. 1 is not intended to illustrate indication apparatus described as part of the background description, above). The circuit of FIG. 1 is for connection on one side at supply terminals 10 and 11 to the line conductors of, for example, a conventional electrical distribution system such as a 120-Volt, 60 hertz system in the United States. In this example, terminal 10 is for connection to a hot line conductor or "black" wire, and terminal 11 is for connection with a neutral or "white" wire, and the respective conductors of this surge suppressor circuit will be so referred to as the hot line conductor 12 and the neutral line conductor 14.

On the other side of the surge suppressor circuit are terminals for connection with a load that is to be protected by the surge suppressor. Terminal 14 is on the hot line conductor 12, and terminal 15 is on the neutral line conductor 13.

In addition, the circuit of the surge suppressor includes a conductor for connection with the ground conductor of the electrical distribution system at a terminal 16 where the ground or "green" wire 17 is connected. Conductor 17 may have another terminal 18 for connection with the load.

Three surge suppressor circuit branches are illustrated in FIG. 1. A first surge suppressor circuit branch includes a fuse 20 and a first varistor 22 connected between the line conductors 12 and 13. A second surge suppressor circuit branch includes the fuse 20 in series with a second varistor 24 connected between the hot line conductor 12 and the ground conductor 17. In addition, a third surge suppressor circuit branch including a third varistor 26 is connected between the neutral line 13 and ground 17.

Each of the varistors 22, 24, and 26 is selected to breakover and become highly conductive at voltage levels across their terminals sufficiently low to provide protection of the load against any likely damage In addition, because economical and available varistors so applied may themselves be subject to damage from excess overvoltages, the fuse 20 is provided and is selected in order to operate and avoid a fire hazard if either varistor 22 or 24 fails and presents a short circuit. When the fuse 20 operates, both varistors 22 and 24 are disconnected from the hot line 12. The third varistor 26 still remains in circuit between the neutral 13 and ground 17. It is desired to provide by the present invention effective means for indicating to a user the status of the fuse 20, both to confirm it is connected and surge protection is being provided across each pair of conductors, or to provide positive indication that it is not connected and that the load is energized without protection against surges that may harm it.

Furthermore, a purpose of the invention is to provide simplicity and economy so that the protection and indication functions can be performed in a package that is economical and convenient for use in general household and a commercial applications.

Figure 2:
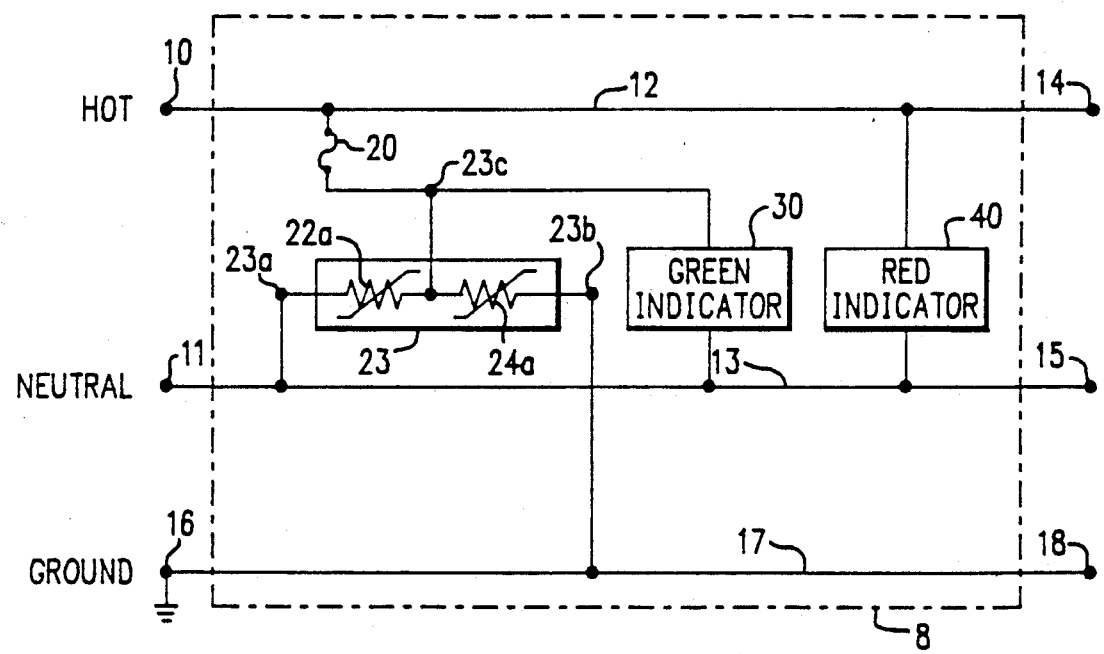
FIG. 2 is a circuit schematic of surge suppressor and dual indicator apparatus in accordance with an embodiment of the present invention.

In FIG. 2 is shown a general schematic of an embodiment of the present invention. Elements corresponding to those of FIG. 1 will be found in FIG. 2 except that the third varistor 26 is not included. Varistor 22a provides protection between lines 12 and 13. Varistor 24a provides protection between line 12 and ground 17. Varistors 22a and 24a are in a single unit 23 with three conductive leads 23a, 23b, and centertop 23c, to be described more fully below.

In accordance with the preferred embodiments of the invention, the connection of the varistors 22a and 24a in the manner shown between the neutral 13 and the ground 17 conductors provides satisfactory protection. As will be subsequently described in more detail, minimization of components affords more compact and economical arrangements. All of elements within the line 8 may comprise a wiring device such as a receptacle, with terminals 10, 11 and 16 wired to supply conductors and terminals 14, 15 and 18 being contacts receiving plug blades from a load.

The circuit of FIG. 2 has a first ("green") indicator circuit portion for indicating power is on and surge protection is present First indicator circuit portion 30 includes a first indicator device energized by line conductors 12 and 13 when the fuse 20 is intact. Such a green indicator circuit portion is substantially in accordance with prior art surge suppressors.

FIG. 2 also includes a second ("red") indicator circuit portion 40 for indicating power is on and surge protection is lacking. The second indicator circuit portion 40 includes a second indicator device energized by the line conductors when the fuse 20 has been interrupted. Impedance levels of the indicator circuit portions 30 and 40 are selected so that circuit portion 40 is not fully energized when circuit portion 30 is energized, thus avoiding any confusion of the indicators' signals.

The colors, green and red, for circuits 30 and 40, respectively, are matters of choice.

Figure 3:
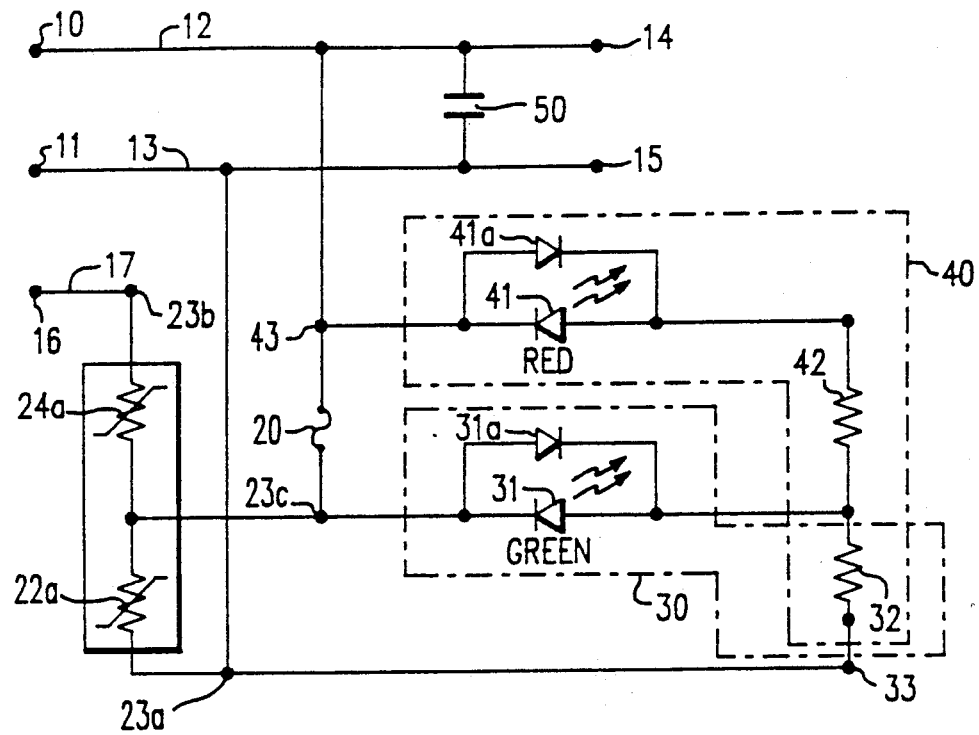
FIG. 3 is a more specific example of the present invention.

Now referring to FIG. 3, a more specific embodiment of the present invention is illustrated by way of example. Here, the elements of the general schematic of FIG. 2 are shown with further details of the indicator circuit portions 30 and 40. The green circuit portion 30 includes a green light-emitting diode 31 in series with a first resistor 32 connected between a first circuit point 23c which is between the fuse 20 and the first varistor 22a, and a second circuit point 33 that is arranged for connection with one of the line conductors, specifically here the neutral conductor 13.

The red indicator circuit portion 40 includes a red LED 41 connected in series with a second resistor 42 as well as the first resistor 32 that is also included in the green circuit portion 30. The series combination of indicator 41 and resistors 42 and 32 is connected between a third circuit point 43 for connection with the hot line conductor 12 and with the second circuit point previously referred to, 33. Resistor 32 is therefore in both circuits 30 and 40.

By way of further example, the following specific components are identified as suitable in a surge suppressor as illustrated in FIG. 3 for use with a 120-volt, 60 hertz electrical distribution system.

Fuse 20 is a Littlefuse type 224, 125-volt AC, fuse. Indicators 31 and 41 are respectively green and red light-emitting diodes type AND124G. The green LED has a breakover voltage of about 2.4 V. and the red LED has a breakover voltage of about 1.5 V. in accordance with normal commercial availability. Each such light-emitting diode 31 and 41 has another, secondary, diode 31a, 41a in inverse parallel relation to it to prevent reverse voltages of greater than one-half volt from appearing across the light-emitting diode in accordance with standard practice. In this example, diodes 31a and 41a are Type 4007. The first resistor 32 is a 20,000 ohm ±5 percent, one-half watt, 300-volt resistor. The second resistor 42 is a 5,000 ohm, ±5 percent, one-half watt, 300-volt resistor. The varistors 22a and 24a are each metal oxides varistors of 45 joules energy storage capacity. They have a breakover voltage of from 212-214 V. at 1 ma.

In operation it is seen that whenever terminals 10 and 11 are connected with a supply, surge protection for the load is provided in a manner described in connection with FIG. 1. While fuse 20 is conducting, the green circuit portion 30 is energized, and because it has a lower impedance than the second indicator circuit portion 40 as determined by the resistors 32 and 42, it will prominently display a green indication that power is on and surge protection is present.

When a surge occurs on any of the lines 12, 13 and 17 that subjects either of the varistors 22a and 24a to harm, the fuse 20 will operate and effectively take those varistors out of the circuit and also de-energize the green circuit portion 30. The green LED 31 thus goes off. The red LED 41 then sees sufficient voltage to be fully energized and display a prominent red indication that the power is on but full surge protection is not present and the suppressor unit needs to be replaced or to be repaired.

The circuit of FIG. 3 shows a capacitor 50 connected between the hot and neutral conductors 12 and 13. Capacitor 50 is an optional element intended for applications where the surge suppressor is used for additional filtering of transients that affect the load.

In a specific example of the present invention, a surge suppressor as shown in FIG. 3 is provided with a capacitor 50 that is a 0.001 microf. 1000-volt AC capacitor.

An extra useful result occurs from the circuit as shown in FIG. 3 with the LEDs 31 and 41 having the same polarity as shown. The green LED 31 is bright when energized and at the same time the red LED 41 is energized just enough to glow perceptibly. This permits checking the operability of both under normal conditions.

If for any reason one wishes to avoid the red glow of the LED 41 when the green LED 31 is on, it is merely necessary to reverse the polarity of one, such as that of green LED 31. In each instance the secondary diodes 31a and 41a are retained in their inverse parallel relation to the LEDs 31 and 41, respectively.

Figure 4B:
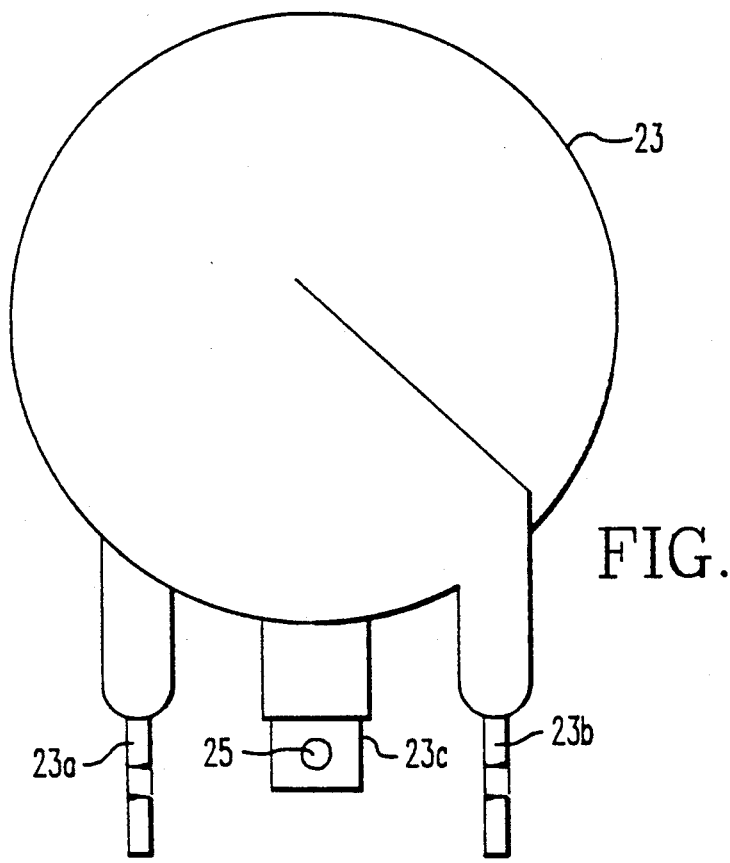

FIGS. 4A and 4B are plan views of a varistor unit 23 as shown schematically in FIG. 2. The difference between the two is that FIG. 4A shows a unit 23 with three wire leads 23a, 23b, and 23c, and FIG. 4B shows a unit in which the center tap conductor 23c' is a flat tab, with an eyelet 25 that facilitates connections in certain applications.

FIG. 5 shows a sectional view of the unit 23 of FIG. 4A. Each varistor 22a and 24a is a disk-like element; they are arranged in parallel relation to each other with leads 23a and 23b, respectively on each outermost surface of the pair of varistors. A third, center-tap 23c, is soldered or otherwise bonded between the two varistor disks. The varistors 22a and 24a are jointly covered with a single insulating cover or casing 28, formed of resinous insulation for example. Unit 23 affords a highly useful element itself that is particularly advantageous in the present invention because of the compactness and economy thereby achieved. Such a three-lead varistor device effectively provides up to three values of nonlinear resistance in a circuit to which it is applied.

The invention has been shown in a few forms only but may be otherwise formed consistent with the teachings herein.

What we claim is:

1. An electrical surge suppressor suitable for incorporation in an electrical receptacle, for protection of a load applied across first and second line conductors and comprising:
    a first surge suppressor circuit branch for connection between the line conductors and including a fuse and a first varistor in series;
    a first indicator circuit portion including a first light emitting diode connected in series with said fuse for indicating power is on and surge protection is present; and
    a second indicator circuit portion including a second light emitting diode connected in shunt with said fuse for indicating power is on and surge protection is lacking.

2. Apparatus in accordance with claim 1 wherein:
    said first indicator circuit portion includes said first light emitting diode connected in series with a first resistor, which combination of light emitting diode and first resistor is electrically connected in parallel with said first varistor; and
    said second indicator circuit portion includes said second light emitting diode connected in series with both said first resistor and with a second resistor, which combination of second light emitting diode and first and second resistors is connected electrically in parallel with said fuse and said first varistor.

3. Apparatus in accordance with claim 1 further comprising:
    a second varistor provided in series with said fuse between a ground conductor and the first line conductor whereby said first and second varistors thereby effectively provide, by direct interconnection therebetween, a combined varistor between the second line conductor and said ground conductor, no other varistor being connected therebetween.

4. Apparatus in accordance with the claim 3 wherein:
    said first and second varistors are each a disk and are arranged together in uniform closely spaced, parallel relationship with a first conductive lead bonded to an outer surface of each one of said pair of disks, and a third conductive lead bonded to intermediate surfaces of each of said pair of disks, and an insulating cover consisting essentially of resinous insulating material from which said leads extend provides all the structure required for said first, second and third varistors.

5. Apparatus in accordance with claim 1 wherein: said first and second light emitting diodes are respectively green and red light emitting diodes, and said light emitting diodes are of like polarity in relation to their respective connections to said fuse, and said red light emitting diode is energized to a low brightness level during a time when said fuse is intact, during which time said green light emitting diode is also energized to confirm operability of both said green and red light emitting diodes during normal operation, and said red light emitting diode is energized to a higher brightness level during a second time when said fuse has been interrupted during which second time, said green light emitting diode is not energized.

6. Apparatus in accordance with claim 1 wherein: said first and second light emitting diodes are respectively green and red light emitting diodes and are connected in opposite polarity in relation to their respective connections to said fuse, and each is respectively energized to approximately equivalent brightness when said fuse is intact and said green light emitting diode is energized, and when said fuse has been interrupted and said red light emitting diode is energized.

7. Apparatus in accordance with claim 1 further comprising:
a capacitor connected between the two line conductors for additional filtering of transients.

8. An electrical surge suppressor, for protection of a load connected across first (hot) and second (neutral) line conductors and a ground conductor of a distribution system of at least three conductors, comprising:
a first surge suppressor circuit branch for connection between the hot and neutral line conductors and including a fuse and a first varistor in series;
a second surge suppressor circuit branch for connection between the hot line conductor and the ground conductor and including the fuse, in common with the first surge suppressor circuit branch, and a second varistor in series;
the first and second varistors each being a disk, both of which are arranged in close parallel relationship with a first conductive lead electrically connected to an outer surface of the first varistor disk, a second conductive lead electrically connected to an outer surface of the second varistor disk, and a third conductive lead electrically connected to intermediate surfaces of each of the first and second varistor disks, the disks being within a common insulating cover from which the conductive leads extend.

9. An electrical surge suppression in accordance with claim 8 wherein:
the varistors are like sized metal oxide varistor disks and the insulating cover consists essentially of resinous insulating material conforming to the configuration of the disks and leads.

10. An electrical surge suppressor in accordance with claim 8 wherein:
the first conductive lead is connected tot he neutral line conductor, the second conductive lead is connected to the ground conductor and the third conductive lead is connected to the fuse which has its other side connected to the hot line conductor.

11. An electrical surge suppressor in accordance with claim 10 wherein: the first and second varistor disks and the first and second conductive leads provide surge suppression between the neutral line and ground conductors, with no varistor of the surge suppressor connected directly between that pair of conductors.

12. An electrical surge suppressor in accordance with claim 9 wherein:
the conductive leads extend directly from and substantially parallel to the respective surfaces.

* * * * *